United States Patent
Takayanagi et al.

(10) Patent No.: US 9,558,252 B2
(45) Date of Patent: Jan. 31, 2017

(54) INFORMATION PROCESSING SYSTEM, DATA MANAGEMENT METHOD, INFORMATION PROCESSING APPARATUS, AND CONTROL METHOD AND CONTROL PROGRAM THEREFOR

(75) Inventors: Nao Takayanagi, Tokyo (JP); Naohisa Matsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 241 days.

(21) Appl. No.: 14/118,870

(22) PCT Filed: May 22, 2012

(86) PCT No.: PCT/JP2012/003346
§ 371 (c)(1),
(2), (4) Date: Nov. 19, 2013

(87) PCT Pub. No.: WO2012/160813
PCT Pub. Date: Nov. 29, 2012

(65) Prior Publication Data
US 2014/0089342 A1    Mar. 27, 2014

(30) Foreign Application Priority Data
May 24, 2011    (JP) ................................. 2011-116367

(51) Int. Cl.
*G06F 17/30*    (2006.01)
*G06F 9/44*    (2006.01)

(52) U.S. Cl.
CPC ... *G06F 17/30569* (2013.01); *G06F 17/30292* (2013.01); *G06F 8/36* (2013.01)

(58) Field of Classification Search
None
See application file for complete search history.

(56) References Cited

U.S. PATENT DOCUMENTS

| | | |
|---|---|---|
| 6,965,903 B1 | 11/2005 | Agarwal et al. |
| 7,028,037 B1 | 4/2006 | Agarwal et al. |
| 7,047,250 B1 | 5/2006 | Agarwal et al. |
| 7,047,253 B1 | 5/2006 | Murthy et al. |

(Continued)

FOREIGN PATENT DOCUMENTS

| | | |
|---|---|---|
| AU | 2002334706 | 4/2003 |
| AU | 2002334721 | 4/2003 |

(Continued)

OTHER PUBLICATIONS

International Search Report corresponding to PCT/JP2012/003346, dated Jul. 11, 2012, 7 pages.
(Continued)

*Primary Examiner* — Anh Tai Tran
(74) *Attorney, Agent, or Firm* — Wilmer Cutler Pickering Hale and Dorr LLP

(57) ABSTRACT

Provided is an information processing apparatus including a file input unit that inputs a data model file representing a data model in a first language for data model description; a first generation unit that generates a database configuration file described in a second language for database description from the data model file; and a second generation unit that generates an application interface described in a third language for application interface description from the data model file.

13 Claims, 19 Drawing Sheets

(56) References Cited

U.S. PATENT DOCUMENTS

| | | | |
|---|---|---|---|
| 7,051,039 B1 | 5/2006 | Murthy et al. | |
| 7,092,967 B1 | 8/2006 | Pannala et al. | |
| 7,281,018 B1 | 10/2007 | Begun et al. | |
| 2003/0033285 A1 | 2/2003 | Jalali et al. | |
| 2003/0065659 A1 | 4/2003 | Agarwal et al. | |
| 2003/0140308 A1 | 7/2003 | Murthy et al. | |
| 2004/0064466 A1 | 4/2004 | Manikutty et al. | |
| 2005/0065949 A1 | 3/2005 | Warner et al. | |
| 2006/0101041 A1 | 5/2006 | Agarwal et al. | |
| 2006/0236306 A1* | 10/2006 | DeBruin | G06F 8/51 717/113 |
| 2007/0050394 A1* | 3/2007 | Sterling | G06F 17/30292 |
| 2009/0150423 A1* | 6/2009 | Spanton | G06F 17/30557 |
| 2009/0282067 A1* | 11/2009 | Bendigeri | G06Q 10/06 |
| 2010/0082669 A1 | 4/2010 | Obitko et al. | |

FOREIGN PATENT DOCUMENTS

| | | |
|---|---|---|
| AU | 2002334747 | 4/2003 |
| CA | 2461854 | 4/2003 |
| CA | 2461871 | 4/2003 |
| CA | 2462300 | 4/2003 |
| CN | 1561496 | 1/2005 |
| CN | 1561497 | 1/2005 |
| CN | 1585945 | 2/2005 |
| CN | 101639776 | 2/2010 |
| CN | 102006309 A | 4/2011 |
| JP | 2004-272871 | 9/2004 |
| JP | 2005-505042 | 2/2005 |
| JP | 2005-505058 | 2/2005 |
| JP | 2005-505059 | 2/2005 |
| JP | 2006-092529 | 4/2006 |
| JP | 2007-188432 | 7/2007 |
| JP | 2008-217612 A | 9/2008 |
| JP | 2011-053891 A | 3/2011 |
| WO | WO-03/027908 | 4/2003 |
| WO | WO-03/030031 | 4/2003 |
| WO | WO-03/030032 | 4/2003 |

OTHER PUBLICATIONS

Tani, Yoshito et al., "Data Schema Extraction from XML-DTD Based on Entity Collection Patterns", IEICE Technical Report, 2003, vol. 103, No. 189, 9 pages.

Extended European Search Report issued by the European Patent Office for Application No. 12788762.8 dated Jun. 30, 2015 (7 pages).

Japanese Office Action issued by the Japan Patent Office for Japanese Application No. 2015-086609 dated Feb. 9, 2016 (6 pages).

Chinese Office Action issued in corresponding Chinese Application No. 201280024946.0, dated Aug. 25, 2015, 14 pages.

* cited by examiner

FIG. 10A

| XML DATA MODEL | SQL DESCRIPTION DATA | | PROCESSING RULE DATA | WSDL DESCRIPTION DATA | |
|---|---|---|---|---|---|
| | COLLECTION OBJECT | COLLECTION CONDITION (ACCURACY, TIME, ETC.) | PROCESS CONTENTS (OPERATOR) | MESSAGE FORMAT | OTHER CONDITIONS |
| DEVICE DATA MODEL | TEMPERATURE, HUMIDITY | | × | M2 | |
| ⋮ | | | | | |
| PROCESSED DATA MODEL | MAXIMUM TEMPERATURE MINIMUM TEMPERATURE | | ○ (MAXIMUM/MINIMUM SELECTION) | M1 | |
| ⋮ | | | | | |

INFORMATION PROCESSING SYSTEM, DATA MANAGEMENT METHOD, INFORMATION PROCESSING APPARATUS, AND CONTROL METHOD AND CONTROL PROGRAM THEREFOR

CROSS-REFERENCE TO RELATED APPLICATIONS

This application is a national stage application of International Application No. PCT/JP2012/003346 entitled "Information Processing System, Data Management Method, Information Processing Apparatus, and Control Method and Control Program Therefor," filed on May 22, 2012, which claims the benefit of the priority of Japanese patent application No. 2011-116367 filed on May 24, 2011, the disclosures of each of which are hereby incorporated by reference in their entirety.

TECHNICAL FIELD

The present invention relates to a technique that collects pieces of data from a plurality of devices and provides the pieces of data in response to requests from a plurality of applications.

BACKGROUND ART

In the above-described technical field, as disclosed in Patent Document 1, a technique is known which generates a schema using a document constructed in an XML compatible format.

RELATED DOCUMENT

Patent Document

[Patent Document 1] Japanese Unexamined Patent Publication No. 2006-092529

DISCLOSURE OF THE INVENTION

However, the above-mentioned related art is just for verifying the correctness of an XML structure. In addition, when the plurality of applications use data having the structure, there is a need to prepare an interface for each of the applications.

An object of the invention is to provide a technique for solving the above-described problems.

In order to achieve the above-described object, an apparatus according to the invention includes a file input unit that inputs a data model file representing a data model in a first language for data model description; a first generation unit that generates a database configuration file described in a second language for database description from the data model file; and a second generation unit that generates an application interface described in a third language for application interface description from the data model file.

In order to achieve the above-described object, a method according to the invention includes a file input step of inputting a data model file representing a data model in a first language for data model description; a first generation step of generating a database configuration file described in a second language for database description from the data model file; and a second generation step of generating an application interface described in a third language for application interface description from the data model file.

In order to achieve the above-described object, a program according to the invention causes a computer to execute a file input step of inputting a data model file representing a data model in a first language for data model description; a first generation step of generating a database configuration file described in a second language for database description from the data model file; and a second generation step of generating an application interface described in a third language for application interface description from the data model file.

In order to achieve the above-described object, an information processing system according to the invention includes an information processing apparatus; a device that is connected to the information processing apparatus through a device interface; and an application that is connected to the information processing apparatus through an application interface. The information processing apparatus includes a file input unit that inputs a data model file representing a data model in a first language for data model description in response to the application; a first generation unit that generates a database configuration file described in a second language for database description from the data model file; a second generation unit that generates an application interface described in a third language for application interface description from the data model file; a data collection unit that collects data to be accumulated in a database from the device through the device interface; and a data providing unit that searches for the data accumulated in the database in response to a data request through a predetermined protocol from the application, and provides desired data to the application through the application interface.

In order to achieve the above-described object, a data management method according to the invention collects data from a device through a device interface, and provides data through an application interface in response to a request from an application. The method includes a file input step of inputting a data model file representing a data model in a first language for data model description, in response to the application; a first generation step of generating a database configuration file described in a second language for database description from the data model file; a second generation step of generating an application interface described in a third language for application interface description from the data model file; a data collection step of collecting data to be accumulated in a database from the device through the device interface; and a data providing step of searching for the data accumulated in the database in response to a data request through a predetermined protocol from the application, and providing desired data to the application through the application interface.

According to the invention, it is possible to collect pieces of data from devices and provide the pieces of data in response to requests from a plurality of applications without having to prepare an interface for each of the applications.

BRIEF DESCRIPTION OF THE DRAWINGS

The above-described objects, other objects, features and advantages will be further apparent from the preferred embodiments described below, and the accompanying drawings as follows.

FIG. 10A is a diagram showing a configuration of a language description conversion table according to the second embodiment of the invention.

DESCRIPTION OF EMBODIMENTS

Hereinafter, exemplary embodiments of the invention will be described in detail with reference to the drawings. However, components described in the following embodiments are just examples, and the technical scope of the invention is not limited thereto.

First Embodiment

Figure 1:
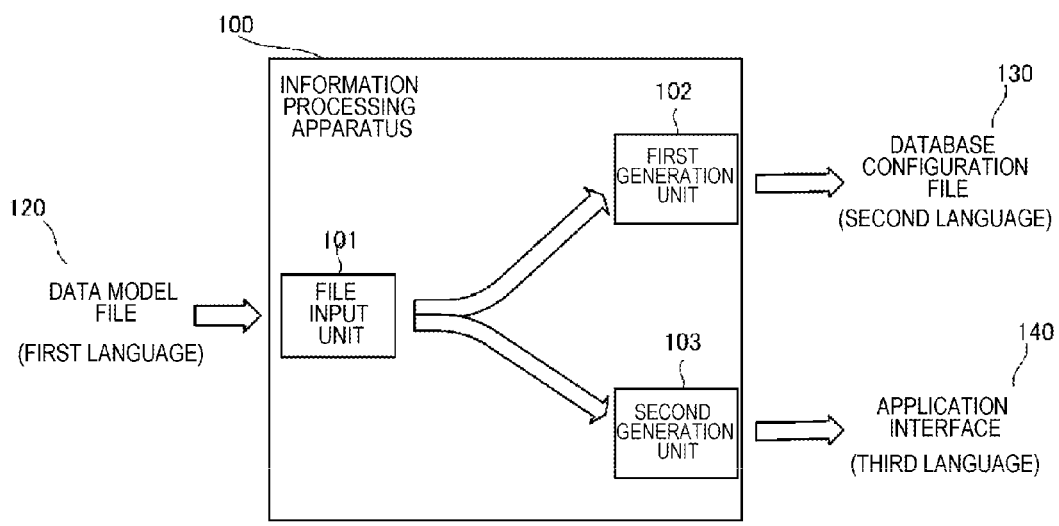
FIG. 1 is a block diagram showing a configuration of an information processing apparatus according to a first embodiment of the invention.

Hereinafter, an information processing apparatus 100 as a first embodiment of the invention will be described with reference to FIG. 1. The information processing apparatus 100 is an apparatus that collects data from a device and provides the data in response to a request from an application.

The information processing apparatus 100 includes a file input unit 101, a first generation unit 102, and a second generation unit 103. The file input unit 101 inputs a data model file 120 that represents a data model in a first language for data model description. The first generation unit 102 generates a database configuration file 130 that is described in a second language for database description from the data model file 120. The second generation unit 103 generates an application interface 140 that is described in a third language for application interface description from the data model file 120.

According to the above configuration, it is possible to collect pieces of data from devices and provide the data in response to requests from a plurality of applications without having to prepare an interface for each of the applications.

Second Embodiment

Hereinafter, an information processing system according to a second embodiment of the invention will be described with reference to FIG. 2 and the subsequent figures.

Functional Configuration of Information Processing System

Figure 2:
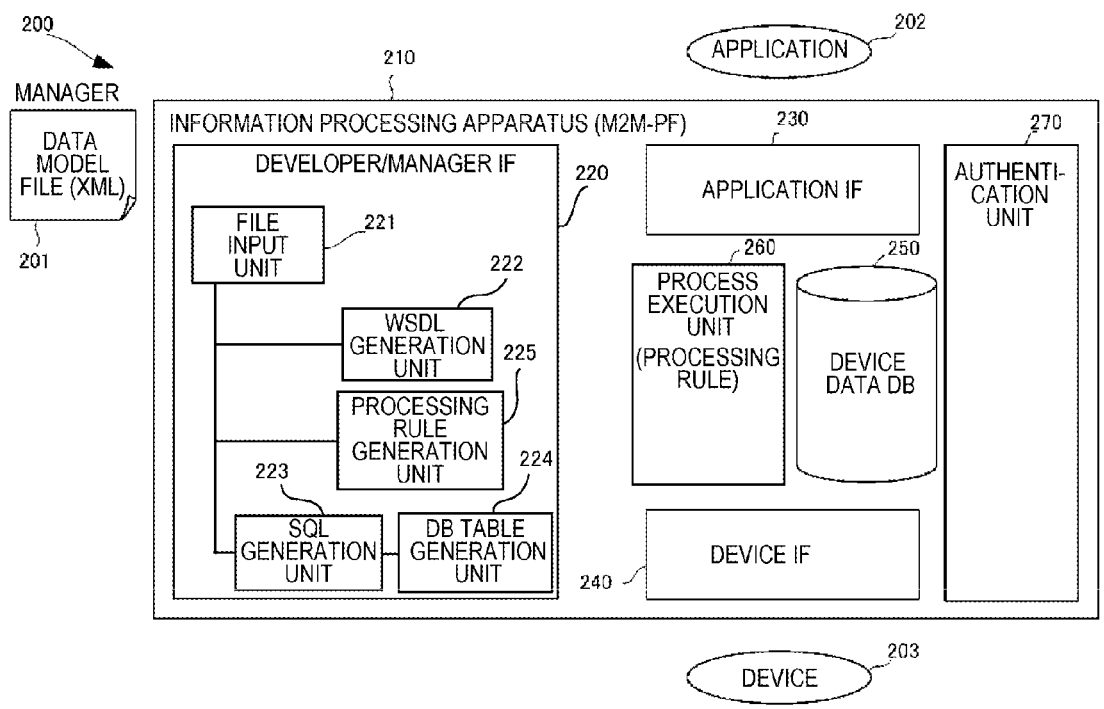
FIG. 2 is a block diagram showing a functional configuration of an information processing system according to a second embodiment of the invention.

FIG. 2 is a diagram illustrating a functional configuration of an information processing system 200 according to the embodiment.

The information processing system 200 includes an information processing apparatus 210 which is a machine-to-machine platform (M2M-PF) of the embodiment. The information processing system includes a data model file 201 that is input to the information processing apparatus 210, an application 202 that receives information from the information processing apparatus 210, and a device 203 that collects information for the information processing apparatus 210. Meanwhile, the application 202 and the device 203 may be constituted by a personal computer or a communication terminal. In addition, the device 203 may be a simple sensor having no brain. Based on such a configuration, the information processing system 200 of the embodiment collects and holds device data and implements data management to be provided to the application.

The information processing apparatus 210 includes a developer/manager IF 220. The developer/manager IF 220 generates an application interface (hereinafter, IF) and a database configuration file from the data model file 201 that is described in an extensible markup language (XML) input by a developer or a manager (hereinafter, also referred to as an operator). In addition, when the data model file 201 input by an operator is a processed data model, a processing rule is further generated.

The developer/manager IF 220 includes a file input unit 221 that inputs the data model file 201 described in an XML. In addition, the developer/manager IF 220 includes a WSDL generation unit 222 that generates a web services description language (WSDL) for application interface description from the input data model file 201 described in an XML. In addition, the developer/manager includes an SQL generation unit 223 that generates a structured query language (SQL) for database description from the input data model file 201 described in an XML, and a DB table generation unit 224 that generates a table having a database configuration on the basis of the SQL.

In addition, the information processing apparatus 210 includes an application IF 230, a device IF 240, a device data database (hereinafter, DB) 250, a process execution unit 260, and an authentication unit 270. The application IF 230 exchanges data with the application 202. The device IF 240 collects information from the device 203 (or provides a service). The device data DB 250 accumulates device data collected from the device 203. The process execution unit 260 executes processing such as collection/accumulation/reading of the device data. In addition, the process execution unit 260 stores the processing rule that is generated on the basis of the processed data model. The authentication unit 270 performs authentication of an operator that inputs the data model file 201, the application 202, and the device 203. Meanwhile, the authentication process performed by the authentication unit 270 is not a main process of the embodiment, and thus the description thereof will not be described in the following operation description.

Operation Procedure of Information Processing System

Figure 3:
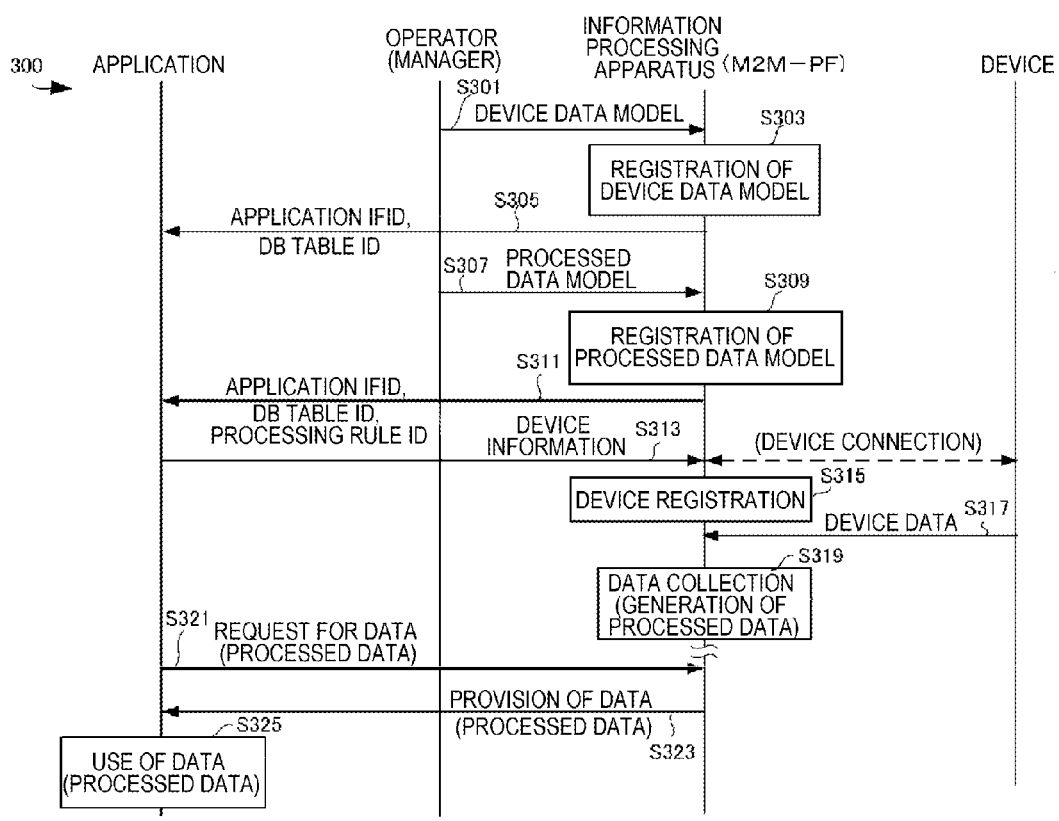
FIG. 3 is a sequence diagram showing an operation procedure of the information processing system according to the second embodiment of the invention.

FIG. 3 is a sequence diagram showing an operation procedure 300 of the information processing system of the embodiment.

First, in step S301, an operator inputs the data model file 201 of the device data model to the information processing apparatus 210 through the file input unit 221. In step S303, in the information processing apparatus 210, an application interface described in a WSDL is generated by the WSDL generation unit 222 on the basis of the device data model. In addition, in the information processing apparatus 210, an SQL for creating a DB table for device data is generated by the SQL generation unit 223 on the basis of the device data model. In the information processing apparatus 210, the DB table for device data is generated by the DB table generation unit 224 by using the SQL, and thus the device data model is registered (see FIG. 4). When the device data model is registered, in step S305, the information processing apparatus 210 notifies the application 202 side of an ID for uniquely determining the application interface and an ID for uniquely determining the DB table which are generated in S303.

In addition, in step S307, an operator inputs the data model file 201 of the processed data model to the information processing apparatus 210 through the file input unit 221. In step S309, in the information processing apparatus 210, an application interface described in a WSDL is generated by the WSDL generation unit 222 on the basis of the processed data model. In addition, in the information processing apparatus 210, an SQL for creating a DB table for processed data is generated by the SQL generation unit 223 on the basis of the processed data model. In the information processing apparatus 210, the DB table for processed data is generated by the DB table generation unit 224 by using the SQL. Further, in the information processing apparatus 210, a processing rule is generated by the processing rule generation unit 225 on the basis of the processed data model, and thus the processed data model is registered (see FIG. 5). When the processed data model is registered, in step S311, the information processing apparatus 210 notifies the application 202 side of an ID for uniquely determining the application interface, an ID for uniquely determining the DB table, and an ID for uniquely determining the processing rule which are generated in S309.

Meanwhile, the device data model and the processed data model are generally mixed in one data model file 201, and steps S301, S303, S305 and S307 are repeated a plurality of times. Therefore, the order thereof is not limited. In addition, an operation of notifying the application 202 side of the IDs may be collectively performed.

Next, in step S313, device information from an application user is set in the information processing apparatus 210 in response to the connection of a device. In step S315, the information processing apparatus 210 registers a device that sends data to the DB table in accordance with the device information (see FIG. 10C).

The information processing apparatus 210 collects device data from the connected device through the device IF 240, and stores and accumulates the device data in the generated DB table. That is, in step S317, the information processing apparatus 210 receives the device data from the device 203. In step S319, the information processing apparatus 210 collects data within the DB table for device data. Alternatively, in step S319, the information processing apparatus 210 generates processed data by processing the collected data on the basis of the processing rule, and stores and accumulates the generated processing data in the DB table for processed data (see FIG. 6).

When the application 202 desires the data (or processed data) collected from the device 203, the application requests the information processing apparatus 210 for the data (processed data) in step S321. The information processing apparatus 210 provides the desired data or the desired processed data of the application 202 which is collected within the DB table. The application 202 performs processing, using the data (processed data) provided from the information processing apparatus 210 (see FIG. 7).

Hereinafter, the operation procedure 300 of the information processing system will be described in more detail. Meanwhile, in FIG. 4 through FIG. 7, functional configuration units that are not used in each operation procedure are deleted or shown by only a simple box.

Registration of Device Data Model

Figure 4:
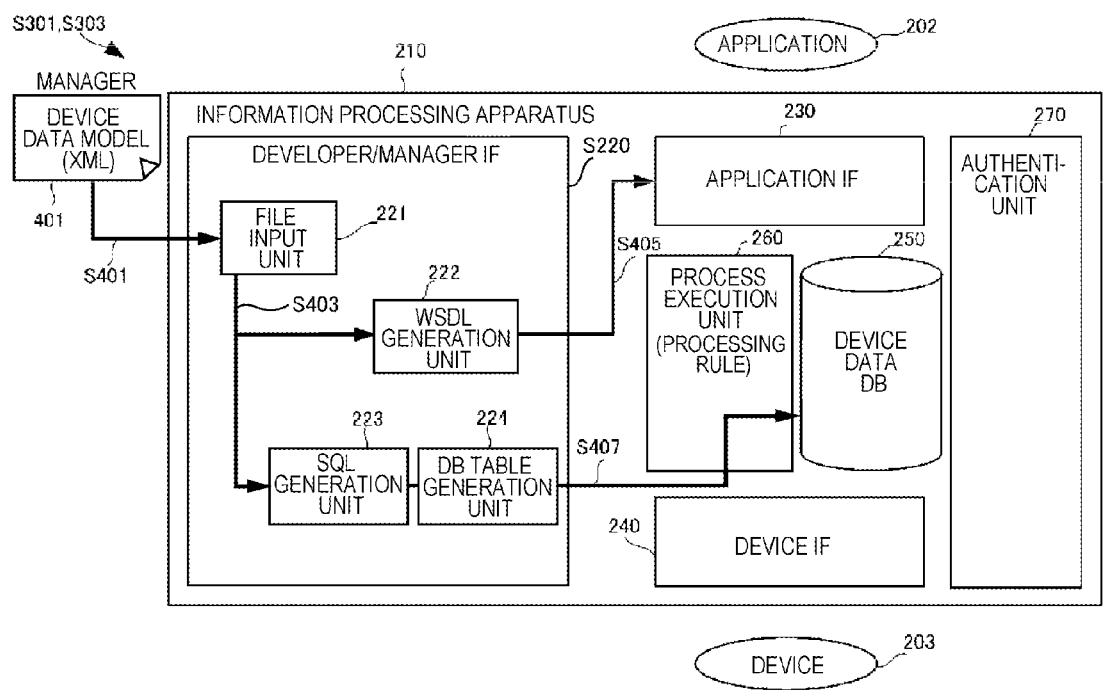
FIG. 4 is a diagram showing a registration procedure of a device data model according to the second embodiment of the invention.

FIG. 4 is a diagram showing the registration procedures S301 and S303 of the device data model according to the embodiment.

In step S401, a device data model 401 described in an XML is input to the file input unit 221. In step S403, the device data model 401 is input to the WSDL generation unit 222 and the SQL generation unit 223. In step S405, a WSDL generated by the WSDL generation unit 222 on the basis of the device data model 401 described in an XML is transmitted to the application IF 230, and is stored. For example, the WSDL generation unit 222 determines what type of information the application 202 transmits in order to specify data to be obtained from a DB table for device data which is generated on the basis of the device data model 401, with reference to a tag within the device data model 401. The WDSL generation unit 222 generates a WSDL based on the determination results.

On the other hand, in step S407, the SQL generation unit 223 generates an SQL on the basis of the device data model 401 described in an XML. The DB table generation unit 224 generates a DB table for device data based on the generated SQL, and secures the generated DB table within the device data DB 250. For example, the SQL generation unit 223 determines what type of element the DB table for device data has, with reference to the tag within the device data model 401. The SQL generation unit 223 creates an SQL for generating a table having the element on the basis of the determination results. The DB generation unit 224 generates the DB table for device data by using the SQL.

Registration of Processed Data Model

Figure 5:
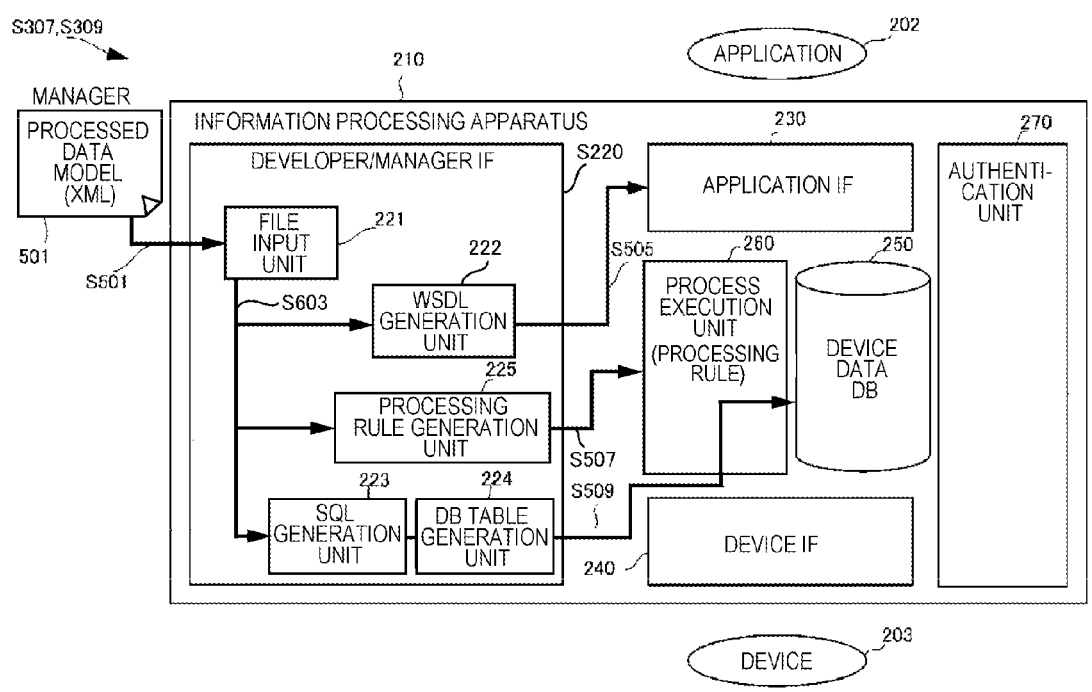
FIG. 5 is a diagram showing a registration procedure of a processed data model according to the second embodiment of the invention.

FIG. 5 is a diagram showing the registration procedures S307 and S309 of the processed data model according to the embodiment.

In step S501, a processed data model 501 described in an XML is input to the file input unit 221. In step S503, the processed data model 501 is input to the WSDL generation unit 222, the SQL generation unit 223, and the processing rule generation unit 225. In step S505, a WSDL generated by the WSDL generation unit 222 on the basis of the processed data model 501 described in an XML is transmitted to the application IF 230, and is stored. A flow in which the WSDL generation unit 222 generates the WSDL on the basis of the processed data is the same as the flow of the device data model described above.

In addition, in step S507, a processing rule generated by the processing rule generation unit 225 on the basis of the processed data model 501 described in an XML is prepared within the process execution unit 260. The processing rule generation unit 225, based on the information set in the processed data model 501, generates a processing rule for determining how to apply a function (for example, a function for calculating a maximum value, a minimum value, or an average value of data) which is prepared in advance in the process execution unit 260 to a device data, how to process the device data, and the like. Here, in the processed data model 501, information is defined such as a range of device data to which a certain function is to be applied or a time interval to which the processing rule is to be applied. In addition, a new function is defined in the processed data model 501 in addition to the function that is prepared in the process execution unit 260 in advance so that the processing rule generation unit 225 can generate a processing rule, using the function that is defined in the processed data model 501.

In addition, in step S509, the SQL generation unit 223 generates an SQL on the basis of the processed data model 501 described in an XML. The DB table generation unit 224 generates a DB table for processed data by using the generated SQL, and secures the generated DB table within the device data DB 250. A flow in which the DB table generation unit 224 creates the DB table for processed data is the same as the flow of the device data model described above.

Collection of Data or Generation of Processed Data

Figure 6:
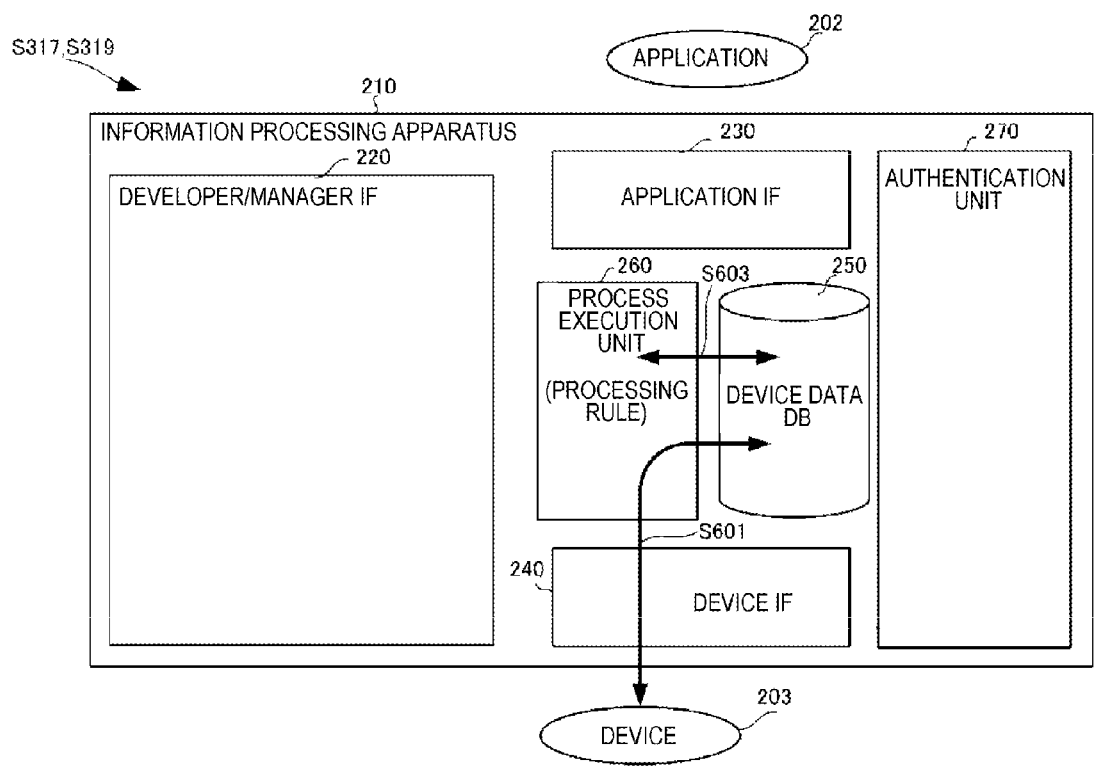
FIG. 6 is a diagram showing a procedure of collecting data or generating processed data according to the second embodiment of the invention.

FIG. 6 is a diagram showing the procedures S317 and S319 of collecting data or generating processed data according to the embodiment.

In step S601, the device data from the device 203 is accumulated in the DB table for device data within the device data DB 250. On the other hand, in step S603, the data from the DB table for device data is read out and is processed in accordance with the processing rule within the process execution unit 260, and processed data is accumulated in the DB table for processed data within the device data DB 250. For example, it is assumed that temperature and humidity are collected as device data every minute by a certain sensor A, and are stored in a DB table for device data (for sensor A). In addition, it is assumed that a processing rule that "average temperature and average humidity every hour are calculated and recorded" is set within the process execution unit 260. In this case, the process execution unit 260 reads out the device data for 1 hour from the DB table for sensor A at 1 hour intervals in accordance with the processing rule, and calculates average temperature and average humidity. The process execution unit 260 accumulates the calculated average temperature and average humidity in the DB table for processed data. Meanwhile, a function that "average is calculated" may be prepared in advance in the process execution unit 260, or may be defined within the processed data model 501.

Provision of Data or Processed Data to Application

Figure 7:
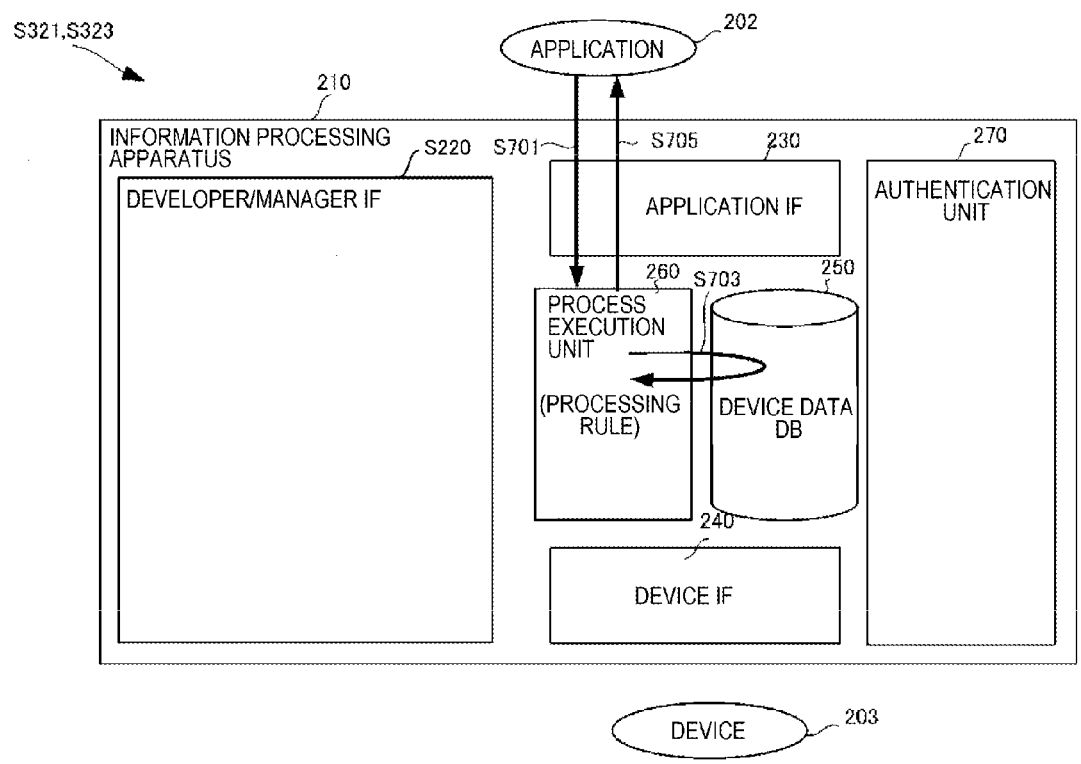
FIG. 7 is a diagram showing a procedure of providing data or processed data to an application according to the second embodiment of the invention.

FIG. 7 is a diagram showing the procedures S321 and S323 of providing data or processed data to the application according to the embodiment.

In step S701, a request from the application 202 is transmitted to the information processing apparatus 210. In step S703, the process execution unit 260 reads out device data that is consistent with the request from pieces of device data that have been accumulated thus far, from the DB table for device data and the DB table for processed data of the device data DB 250, on the basis of the request of the application 202 through the application IF 230. For example, the application 202 includes in the request a key for uniquely determining a record of a DB table that stores data to be obtained, and information for uniquely determining a column of the DB table. Meanwhile, the application 202 can determine the correspondence between the application IF 230 and a DB table storing desired data on the basis of the IDs received in step S305 and step S311. In step S705, the information processing apparatus 210 transmits data corresponding to the request from the application 202. That is, the provision of the data requested by the application 202 is achieved.

Hardware Configuration of Information Processing Apparatus

Figure 8:
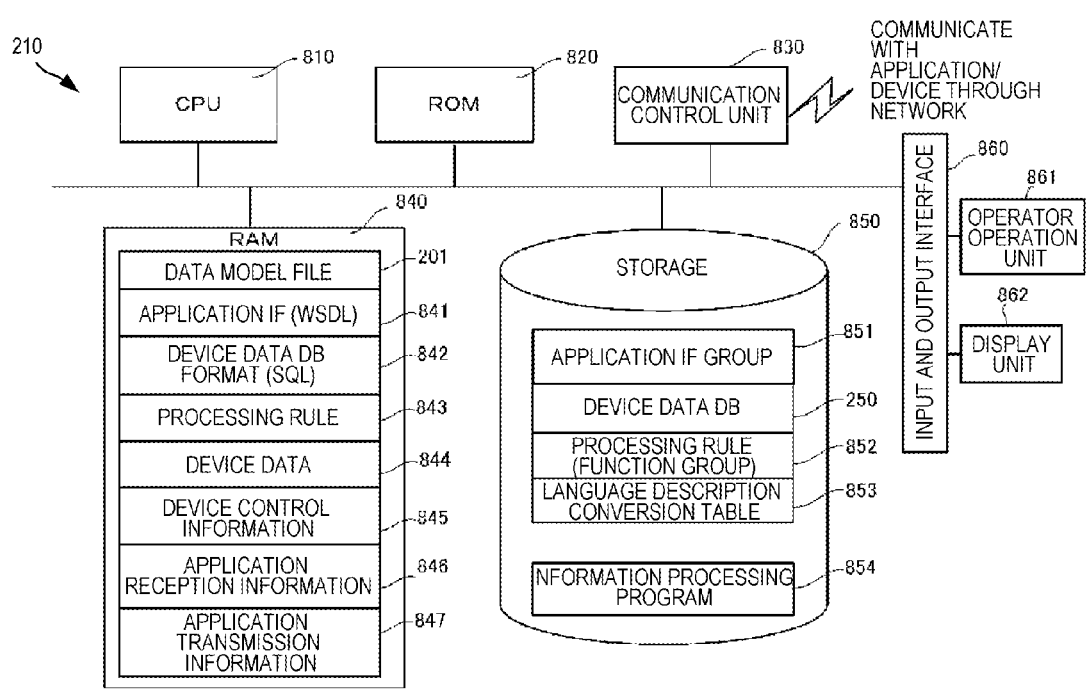
FIG. 8 is a block diagram showing a hardware configuration of an information processing system according to the second embodiment of the invention.

FIG. 8 is a block diagram showing a hardware configuration of the information processing apparatus 210 according to the embodiment. In FIG. 8, the information processing apparatus 210 includes a CPU 810, a ROM 820, a communication control unit 830, a RAM 840, and a storage 850.

The CPU 810 is a central processing unit, and controls the whole information processing apparatus 210 by executing various programs. The ROM 820 is a read only memory, and stores various parameters and the like in addition to a boot program to be initially executed by the CPU 810. The communication control unit 830 controls communication with an application or a terminal of a device through a network. In addition, the RAM 840 is a random access memory, and has various storage areas. The storage 850 stores a program in addition to a data group and a database. The information processing apparatus 210 further includes an input and output interface 860, and is connected to an operator operation unit 861 and a display unit 862 through the input and output interface 860.

The RAM 840 has an area for storing the data model file 201 that is input according to the operator's operation with respect to the operator operation unit 861. In addition, the RAM has an area for storing an application IF 841 described in a WSDL which is generated from the data model file 201 by the information processing apparatus 210, and a format 842 of the device data DB 250 which is described in an SQL. The format 842 of the device data DB 250 includes a DB table for device data and a DB table for processed data. The application IF 841 is set up, and is stored as an application IF group 851 in the storage 850. The DB table for device data and the DB table for processed data are prepared within the device data DB 250 in the storage 850. The RAM 840 also has an area for storing a processing rule 843 that is generated from the processed data model. Such a processing rule 843 is stored in a processing rule (function group) 852 including a function group of the storage 850 which is prepared in advance.

In addition, the RAM 840 has an area for temporarily storing device data 844 that is collected from a device, and the device data 844 is accumulated in the DB table for device data and the DB table for processed data of the device data DB 250 of the storage 850. In addition, the RAM 840 has a storage area for storing device control information 445 for controlling a device. Further, the RAM 840 includes a storage area for storing application reception information 846 received from an application and application transmission information 847 to be transmitted to the application.

On the other hand, the storage 850 stores a language description conversion table 853 for converting a data model described in an XML to an application interface described in a WSDL and a database configuration described in an SQL, in addition to the application IF group 851, the device data DB 250, and the processing rule (function group) 852. In addition, the storage 850 stores an information processing program 854. The CPU 810 reads out and executes the information processing program 854, the application IF group 851, the processing rule (function group) 852, the language description conversion table 853, or the like so as to implement the functional configurations of FIG. 2 and the processing thereof (see FIG. 4 through FIG. 7).

Meanwhile, FIG. 8 shows only data and programs that are essential for the embodiment, and does not show general-purpose data or program such as an OS.

Data Model

Figure 9:
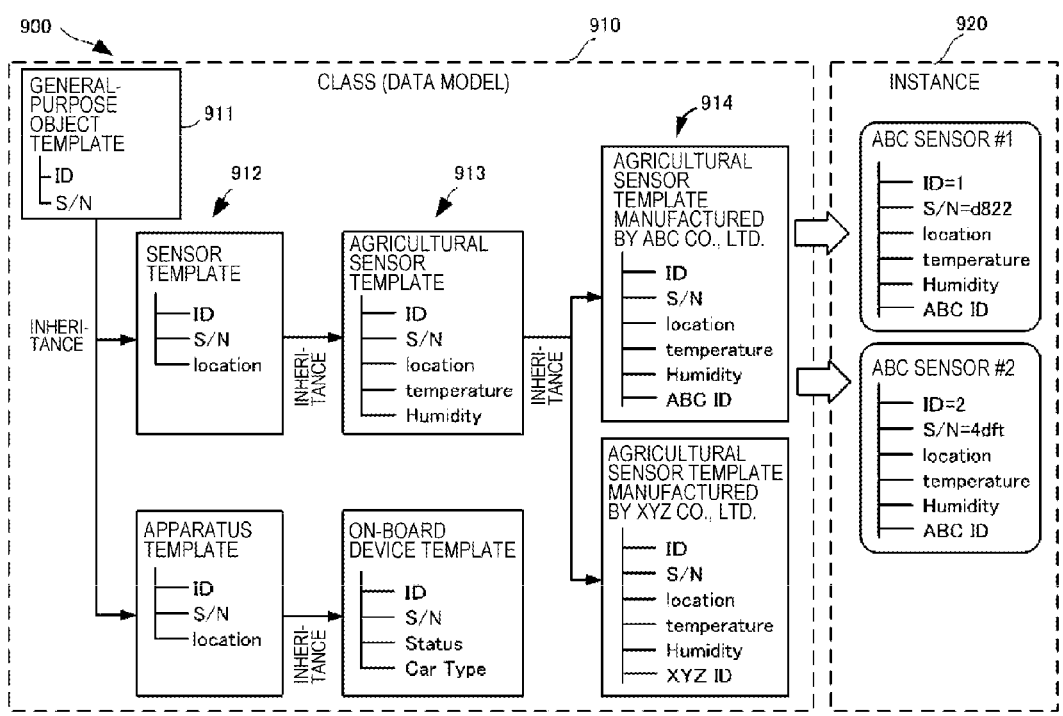
FIG. 9 is a diagram showing a configuration of a data model according to the second embodiment of the invention.

FIG. 9 is a diagram showing a configuration 900 of a data model according to the embodiment. The data model may be prepared in advance as a support when a developer (operator) describes the data model in an XML. In this case, a template of the data model is stored in the storage of FIG. 8 and is interactively provided to the developer (operator).

The data model of the embodiment can be created by inheriting an abstract model. In the example, the template is divided into a total of four layers of a general-purpose object template 911, a device type layer 912, an industry-classified type layer 913, and a real model layer 914, using the general-purpose object template as a parent class (abstract class). In the example on the upper stage of FIG. 9, the template is inherited as follows: "general-purpose object"→"sensor"→"agricultural sensor"→"agricultural sensor manufactured by ABC Co., Ltd.", and thus a data model is created. That is, an attribute of a parent data model is inherited to a child data model. An instance (substance) 920 is generated by inputting a value to the data model.

Language Description Conversion Table

FIG. 10A is a diagram showing a configuration of the language description conversion table 853 according to the embodiment. Meanwhile, the invention is not limited to the configuration.

In the language description conversion table 853, a collection object, collection conditions, or the like is stored as SQL description data 1012 for describing an SQL which generates a database, in association with the description of an XML data model 1011. In addition, a processing rule data 1013 corresponding to processing in case of a processed data model is stored. In addition, a message format to be used or other conditions is stored as WSDL description data 1041 for describing an application interface in a WSDL. Meanwhile, for example, accuracy or a collection time unit of data can be set as the collection conditions of the SQL description data 1012.

For example, in response to the device data model 1021, "temperature" and "humidity" are stored as the collection object in the SQL description data 1012, and M1 is stored as the message format in the WSDL description without processing. In addition, in response to the processed data model 1022, "maximum temperature" and "minimum temperature" are stored as the collection object in the SQL description data 1012, the selection (arithmetic operation) of maximum/minimum is stored in the processing, and M2 is stored as the message format in the WSDL description.

Generation of DB Table

Figure 10B:
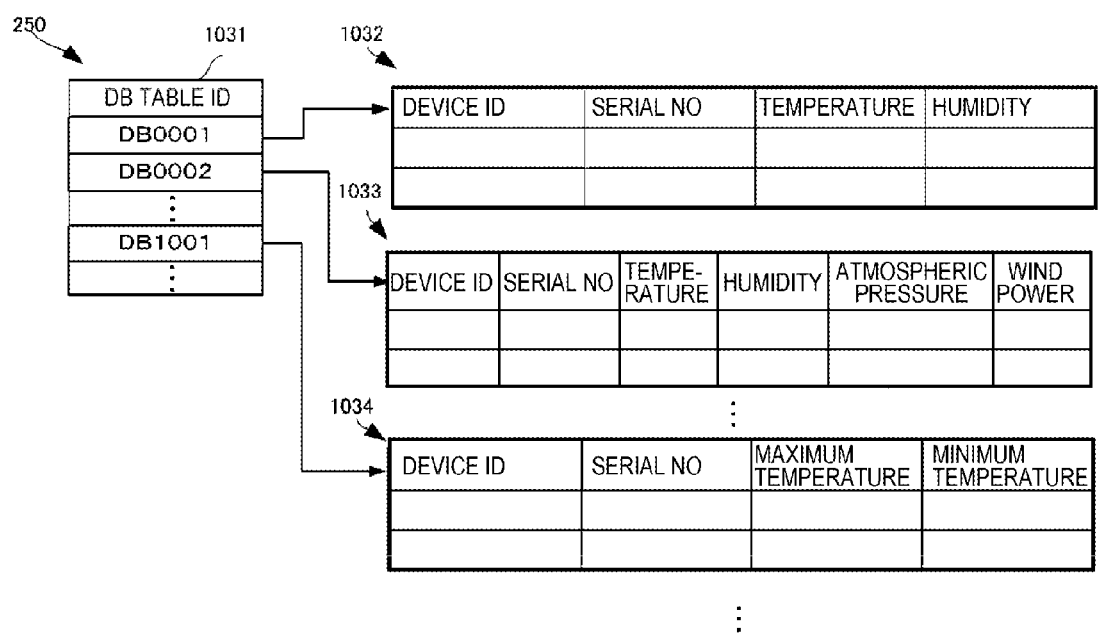
FIG. 10B is a diagram showing a configuration of a device data DB through the generation of a DB table according to the second embodiment of the invention.

FIG. 10B is a diagram showing a configuration of the device data DB 250 through the generation of a DB table according to the embodiment.

In the device data DB 250, the generated DB table for device data or DB table for processed data is accumulated in a searchable manner. For this reason, a unique DB table ID is attached when creating the DB table, and the DB table ID is registered in a DB table ID list 1031. Empty DB tables 1032, 1033, and 1034 are secured in association with the DB table IDs. In FIG. 10B, the DB table 1032 having a DB table ID of "DB0001" collects temperature and humidity, and the DB table 1033 having a DB table ID of "DB0002" collects temperature, humidity, atmospheric pressure, and wind power. In addition, the DB table 1034 having a DB table ID of "DB 1001" is a DB table for processed data, and collects the maximum temperature and the minimum temperature. In the embodiment, for example, a DB table in which the highest level of numeric portions in a DB table ID is "1" indicates a DB table for processed data.

Device Setting

Figure 10C:
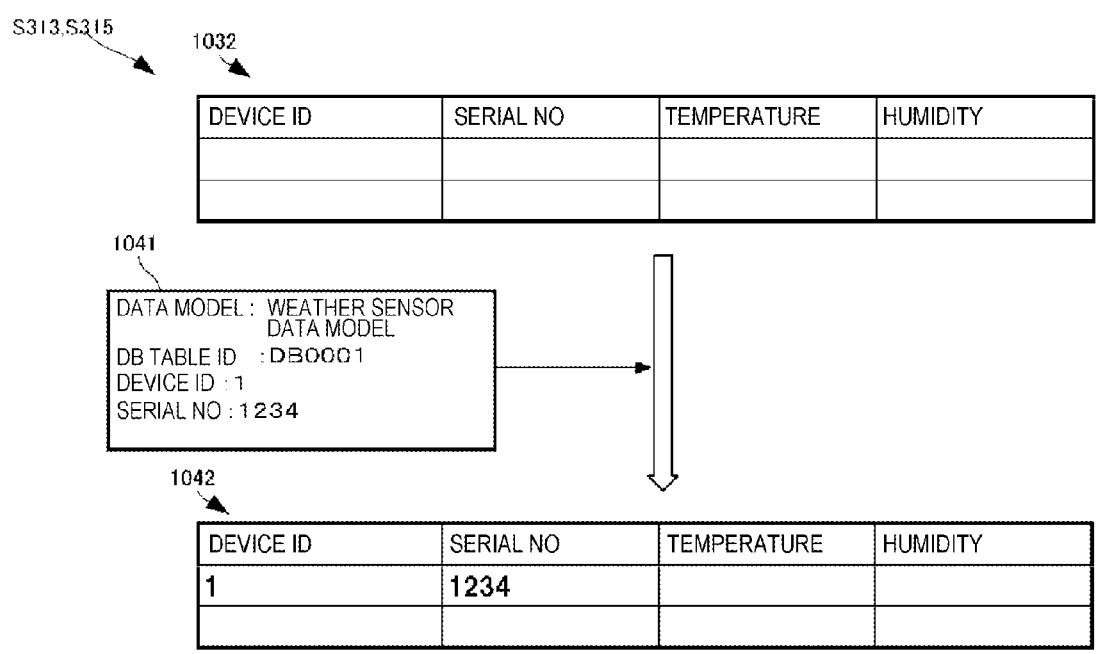
FIG. 10C is a diagram showing device setting to the DB table through a device connection and a setting input according to the second embodiment of the invention.

FIG. 10C is a diagram showing device setting procedures S313 and S315 to a DB table through a device connection and a setting input according to the embodiment. In the example, the empty DB table 1032 of FIG. 10B will be described, but the same is true of device setting to other DB tables.

With respect to the empty DB table 1032, device information 1041 is set in which a device ID is "1" and a serial No is "1234" from the application 202. When the device is connected to the information processing apparatus 210, a DB table 1042 in which the device is set is created, and thus the preparation for information collection is made.

Device Data Accumulation

Figure 10D:
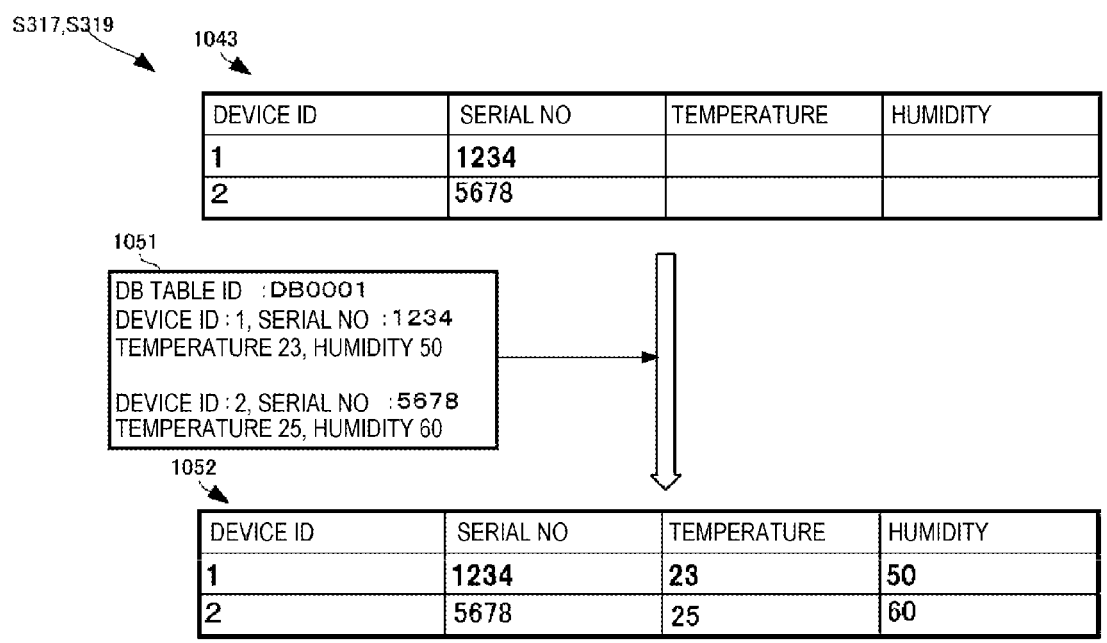
FIG. 10D is a diagram showing the accumulation of device data to the DB table through the reception of device data according to the second embodiment of the invention.

FIG. 10D is a diagram showing device data accumulation procedures S317 and S319 to a DB table through the reception of device data according to the embodiment. Meanwhile, this example will be described on the basis of the DB table 1032, but the same is true of other DB tables. In addition, in FIG. 10D, description will be given assuming that a device is further connected in which a device ID is "2" and a serial No is "5678" to the configuration of FIG. 10C.

With respect to a DB table 1043 in which two devices are set, it is assumed that temperature of 23 (° C.) and humidity of 50(%) are received from a device having a device ID of "1" and temperature of 25 (° C.) and humidity of 60(%) are received from a device having a device ID of "2" (1051 of FIG. 10D). The information processing apparatus 210 stores these pieces of received data, and thereby creating a DB table 1052.

Generation of Processing Rule and Generation of Application Interface

Figure 10E:
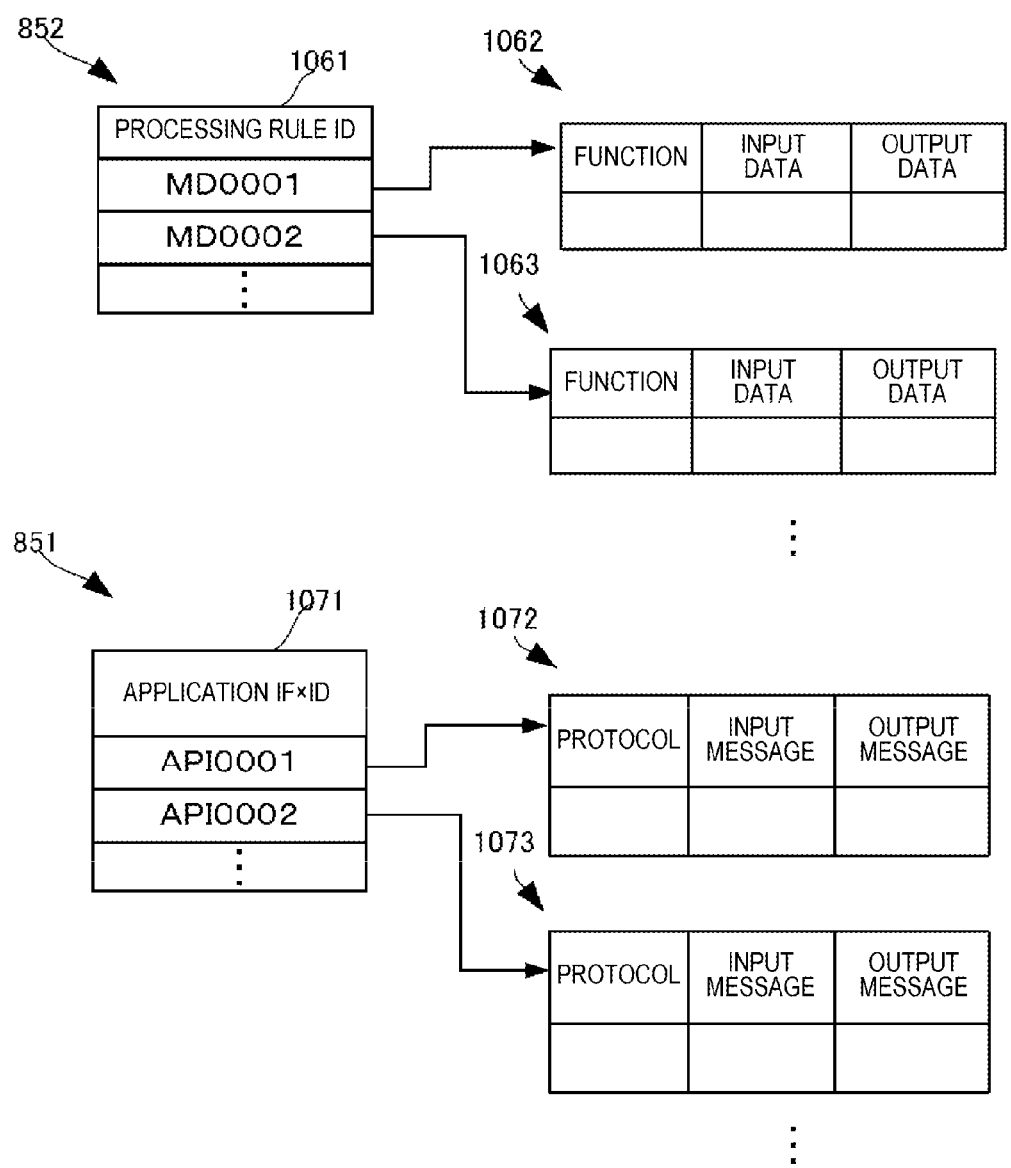
FIG. 10E is a diagram showing configurations of a processing rule (function group) and an application IF group through the generation of a processing rule and the generation of an application interface according to the second embodiment of the invention.

FIG. 10E is a diagram showing configurations of a processing rule (function group) 852 and an application IF group 851 through the generation of a processing rule and the generation of an application interface according to the embodiment.

A processing rule is accumulated in the processing rule (function group) 852 in a searchable manner. For this reason, a unique processing rule ID is attached when creating the processing rule, and the processing rule ID is registered in a processing rule ID list 1061. Processing rules 1062 and 1063 are secured in association with each processing rule ID. The processing rules 1062 and 1063 are defined by, for example, a function, input data, and output data, but the invention is not limited thereto.

In addition, an application IF is accumulated in the application IF group 851 in a searchable manner. For this reason, a unique application IF•ID is attached when creating the application IF, and the application IF•ID is registered in an application IF•ID list 1071. Application IFs 1072 and 1073 are then secured in association with each application IF•ID. The application IFs 1072 and 1073 are defined by, for example, a protocol, an input message, and an output message, but the invention is not limited thereto.

Generation of Application Interface and Database

Figure 11:
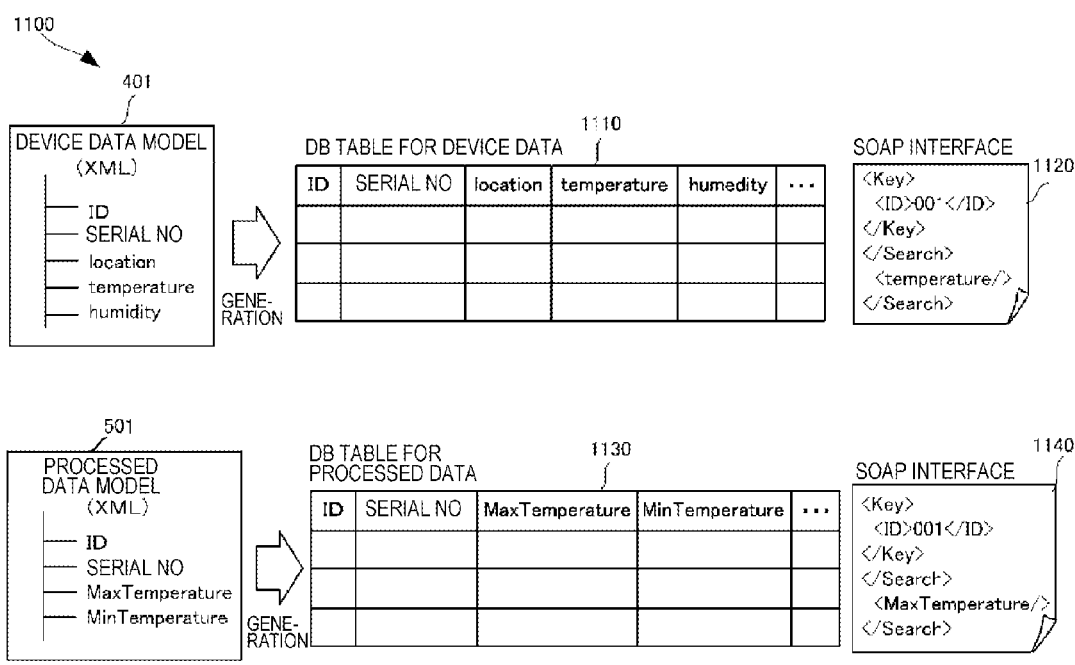
FIG. 11 is a diagram showing an example of generating an application interface and a database in the information processing apparatus according to the second embodiment of the invention.

FIG. 11 is a diagram showing an example 1100 of generating an application interface and a database in the information processing apparatus according to the embodiment.

An upper stage of FIG. 11 is a diagram showing a DB table 1110 for device data which is generated in case of the device data model 401, and a simple object access protocol (SOAP) interface 1120. In the DB table 1110 for device data, a location, temperature, humidity, and the like are stored in association with a device ID and a serial No. In addition, according to the SOAP interface 1120, the temperature of an ID 001 is searched.

On the other hand, a lower stage of FIG. 11 is a diagram showing a DB table 1130 for processed data which is generated in case of the processed data model 501, and a SOAP interface 1140. In the DB table 1130 for processed data, maximum temperature (Max Temperature), minimum temperature (Min Temperature), and the like are stored in association with a device ID and a serial No. Processing for finding the maximum temperature (Max Temperature) or the minimum temperature (Min Temperature) serves as a processing rule, and thus, for example, when a function for finding the maximum temperature from data in a range designated by arguments is prepared, a processing rule that "the maximum temperature is found from data in a given range" can be generated by determining an argument of the function. Each piece of information is stored in a DB table for processed data in accordance with the processing rule. In addition, according to the SOAP interface 1140, the maximum temperature of the ID 001 is searched.

Meanwhile, FIG. 11 shows an SOAP interface, but an interface of a predetermined protocol useful in the embodiment can be used.

Operation Procedure of Information Processing Apparatus

Figure 12:
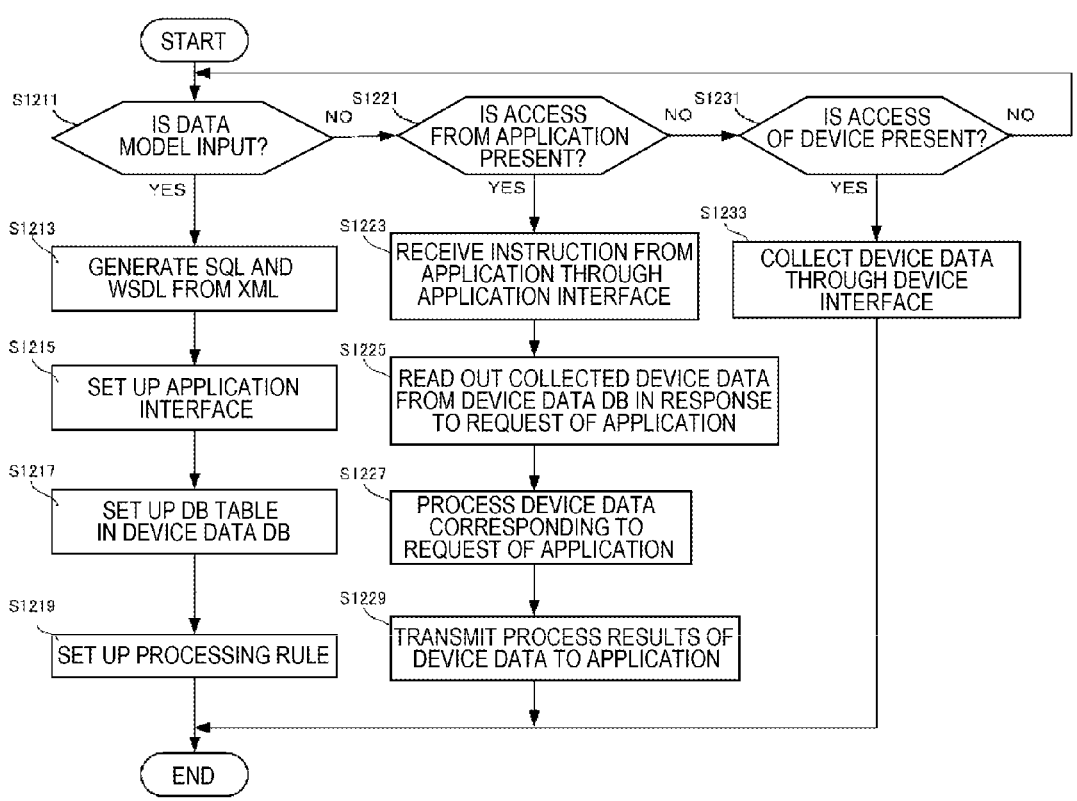
FIG. 12 is a flow chart showing an operation procedure of the information processing apparatus according to the second embodiment of the invention.

FIG. 12 is a flow chart showing an operation procedure of the information processing apparatus 210 according to the embodiment. The flow chart is executed while using the RAM 840 by the CPU 810 of FIG. 8, and thus the functional configuration units of FIG. 2 are embodied.

First, in step S1211, the information processing apparatus 200 determines whether a data model is input. In addition, in step S1221, the information processing apparatus determines whether access from the application 202 is present. In addition, in step S1231, the information processing apparatus determines whether access from the device 203 is present. Meanwhile, in the embodiment, the determination is performed in the order of S1211, S1221, and S1231, but the order of performing these determinations can be arbitrarily set.

When a data model is input, the process proceeds to step S1213, and thus the information processing apparatus 210 generates a DB table described in an SQL and the application interface 230 described in a WSDL from a data model described in an XML. Next, in step S1215, the information processing apparatus 210 sets up the generated application interface 230. In step S1217, the information processing apparatus 210 sets up the generated DB table in the device data DB 250. In step S1219, the information processing apparatus 210 sets up the generated processing rule.

When access from the application 202 is present, the process proceeds to step S1223, and thus the information processing apparatus 210 receives an instruction message from the application 202 through the application interface 230. Next, in step S1225, the information processing apparatus 210 reads out collected device data from the device data DB 250 in response to a request of the application 202. In step S1227, the information processing apparatus 210 performs processing of device data corresponding to the request of the application. In step S1229, the information processing apparatus 210 transmits the processing results of the device data in response to the request of the application.

When access from the device 203 is present, the process proceeds to step S1233, and thus the information processing apparatus 210 collects device data through the device interface 240 and accumulates the device data in the device data DB 250.

Meanwhile, in the embodiment, in case of processed data model, processed data may be accumulated in advance in the DB table of the device data DB 250, or may be transmitted to the application by performing processing on the device data from the device data DB 250 at the time of access from the application 202. Alternatively, a case of processing at the time of accumulation to the device data DB 250 and a case of processing at the time of access from the application 202 may be separated from each other according to the complexity of processed contents.

Specific Generation Example

A specific example of generating an application interface and a DB table from a device data model and a specific example of generating an application interface, a DB table, and a processing rule from a processed data model according to the embodiment are shown below.

Device Data Model

Figure 13:
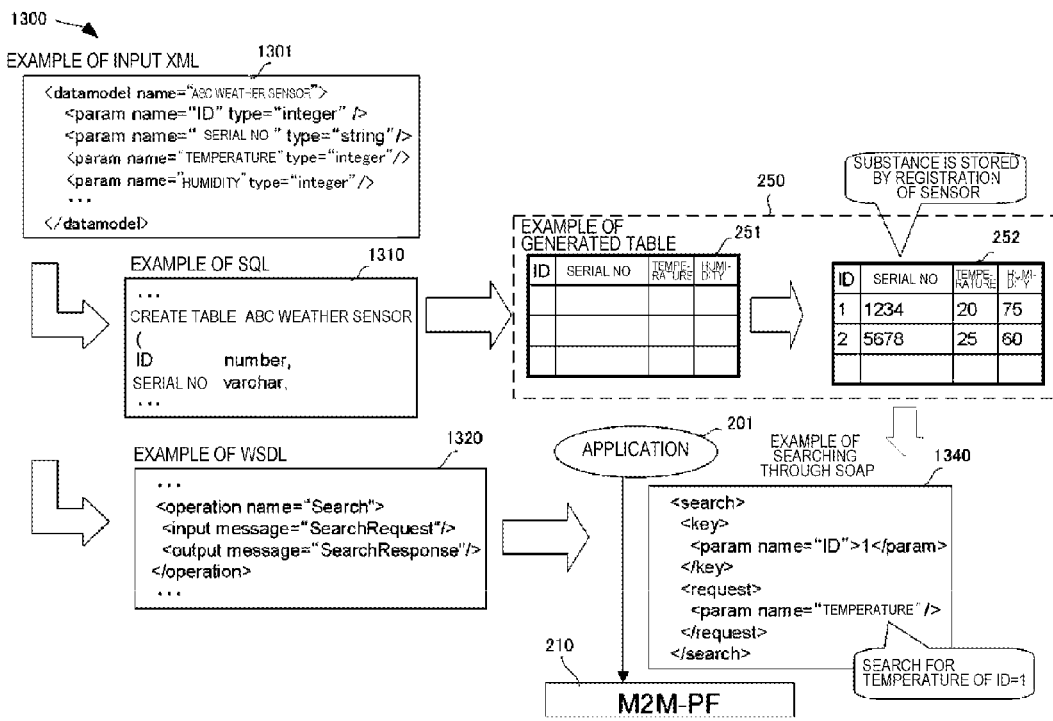
FIG. 13 is a diagram showing a specific example of generating an application interface and a database based on a device data model according to the second embodiment of the invention.

FIG. 13 is a diagram showing a specific example 1300 of generating an application interface and a DB table based on a device data model according to the embodiment.

An example of an input XML shows a device data model 1301. The device data model 1301 has a model name of "ABC weather sensor", and includes "temperature" of an integer, "humidity" of an integer, and the like in association with "ID" of an integer and "serial No" of a character string.

An SQL description 1310 is generated by the SQL generation unit 223 from the device data model 1301 described in an XML. In this example, the SQL generation unit 223 determines what type of element the DB table has with reference to a row in which a tag within the device data model 1301 is "param", and thus generates the SQL description 1310. An empty DB table 251 for device data is generated in the device data DB 250 by the SQL description 1310, and the DB table becomes a DB table 252 in which temperature and humidity are accumulated by collecting device data from a device.

On the other hand, a WSDL description 1320 is generated by the WSDL generation unit 222 from the device data model 1301 described in an XML. In this example, the WSDL generation unit 222 determine a structure or a format of data obtained by the device 203 with reference to a row in which a tag within the device data model 1301 is "param", and thus generates the WSDL description 1320. In such a WSDL description 1320, an input message from the application 202 and an output message to the application 202 are defined as application interfaces.

In this manner, the application IF 230 and the DB table 251 for device data of the information processing apparatus 210 are generated and set up.

With respect to such an information processing apparatus 210, a data request 1340 through an SOAP for searching for the temperature of ID=1 from the DB table 252 is transmitted to the application interface from the application 202. That is, the application 202 can search for necessary data without having to consider processing after the application interface of the information processing apparatus 210.

Processed Data Model

Figure 14:
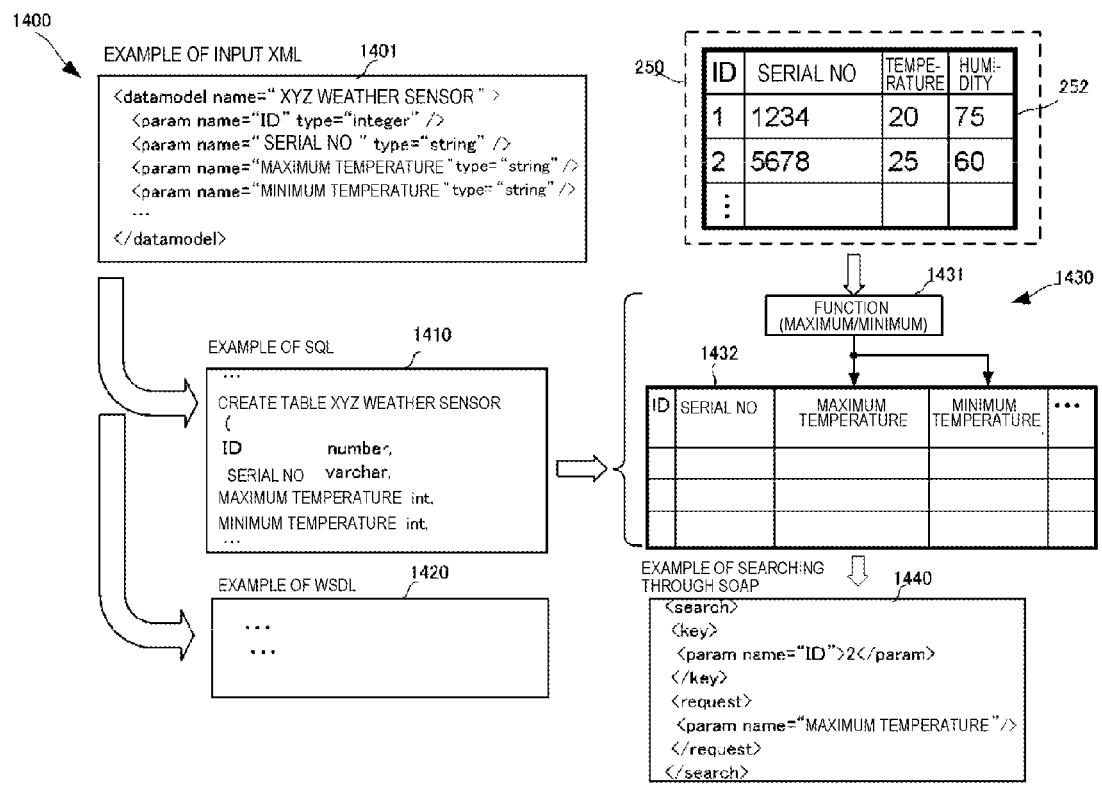
FIG. 14 is a diagram showing a specific example of generating an application interface, a database, and a processing rule based on a processed data model according to the second embodiment of the invention.

FIG. 14 is a specific example 1400 of generating an application interface, a database, and a processing rule based on the processed data model according to the embodiment.

An example of an input XML shows a processed data model 1401. The processed data model 1401 has a model name of "XYZ weather sensor", and includes "maximum temperature" of an integer, "minimum temperature" of an integer, and the like in association with "ID" of an integer and "serial No" of a character string.

Similarly to a case of the device data model, an SQL description 1410 and a WSDL description 1420 are generated from the processed data model 1401 described in an XML. An empty DB table 1432 for processed data which has an area for storing maximum temperature and minimum temperature is generated by such an SQL description 1410. In addition, a processing rule 1431 for finding maximum temperature/minimum temperature by reading out temperature from the DB table 252 of the device data DB 250 is generated by the processing rule generation unit 225, on the basis of information for defining "how to process device data which is an object" of a function to be used, an application range of a function, or the like which is set in the processed data model 1401. Then, the maximum temperature and the minimum temperature are searched from the device data accumulated in the DB table 252 in accordance with the processing rule 1431, and are accumulated in the DB table 1432.

In this manner, at the same time when the application interface 230 and the DB table 1432 for processed data of the information processing apparatus 210 are generated and set up, the processing rule 1431 is set up.

With respect to such an information processing apparatus 210, a processed data request 1440 through an SOAP for searching for the maximum temperature of ID=2 from the DB table 1432 is transmitted to the application interface from the application 202. That is, the application 202 can search for and process necessary data without having to consider processing after the application interface of the information processing apparatus 210.

As described above, according to the embodiment, when a data model described in an XML is input, an application interface and a table of a database are independently generated, and thus data can be obtained by a simple operation from any application. In addition, data processing can also be performed by a simple operation.

Third Embodiment

Hereinafter, an information processing system 1500 according to a third embodiment of the invention will be described with reference to FIG. 15.

Configuration of Information Processing System

Figure 15:
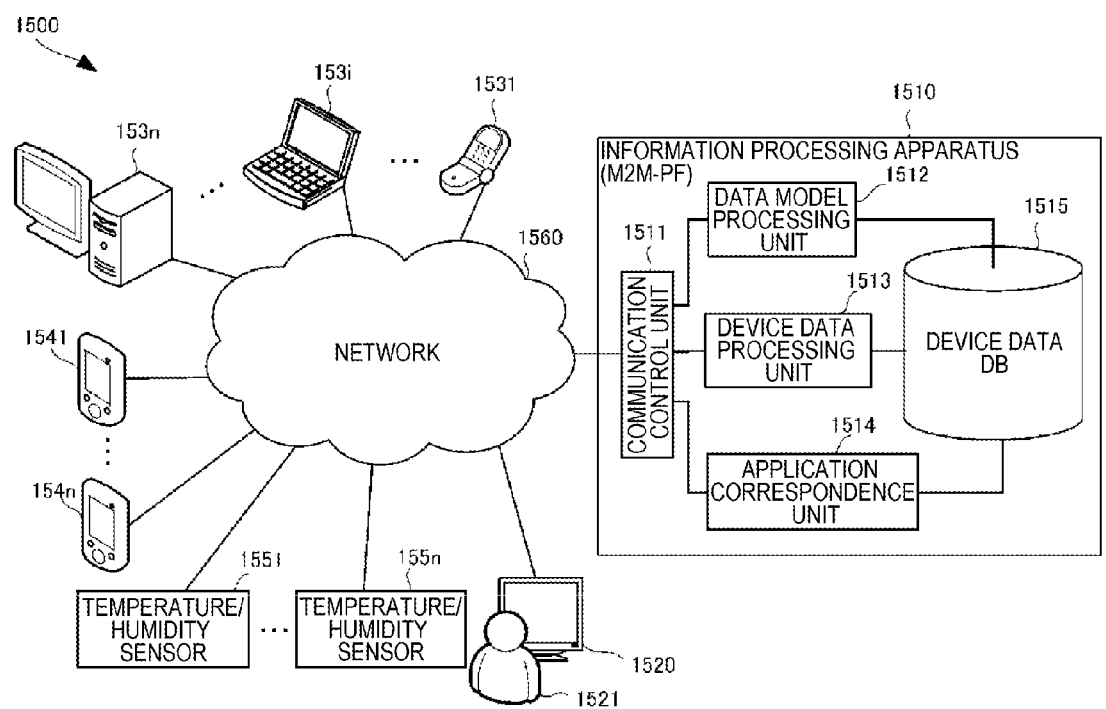
FIG. 15 is a block diagram showing a configuration of an information processing system according to a third embodiment of the invention.

FIG. 15 is a block diagram showing a configuration of the information processing system 1500 according to the embodiment. The information processing system 1500 according to the embodiment is different from information processing system of the second embodiment in that the information processing system according to the embodiment is a cloud system in which all operations including collecting of device data, an inquiry from an application, and an input of a data model are performed through a network. Other configurations and operations are the same as those of the second embodiment, and thus the detailed description thereof will not be repeated.

In the information processing system 1500, application groups 1531 to 153$i$ to 153$n$, a device group (1541 to 154$n$, 1551 to 155$n$), and an operator terminal 1520 to which an operator 1521 inputs a data model are connected to each other through a network 1560. The device group includes portable terminals 1541 to 154$n$, sensors 1551 to 155$n$, or the like. The device group is not particularly limited, as long as it is a device capable of collecting data.

An information processing apparatus 1510 of the embodiment is connected to the network 1560. The information processing apparatus 1510 includes a communication control unit 1511, and communicates with the above-mentioned application groups, device group, and operator terminal through the network 1560. The information processing apparatus 1510 includes a data model processing unit 1512, a device data processing unit 1513, and an application correspondence unit 1514 which are connected to the communication control unit 1511. The information processing apparatus further includes a device data DB 1515 connected to the processing units and the correspondence unit. Here, the configuration of the second embodiment is divided into three parts, that is, the data model processing unit 1512, the device data processing unit 1513, and the application correspondence unit 1514, from the processing object thereof. Therefore, there is only difference in that the data model processing unit 1512 is connected to the communication control unit 1511, that is, the file input unit 221 of FIG. 2 performs transmission and reception through a network similar to an application or a device.

Other Embodiment

So far, the embodiments of the invention have been described, but a system or an apparatus in which various characteristics included in each of the embodiments are combined in various ways is also included in the scope of the invention.

In addition, the invention may be applied to a system constituted by a plurality of devices, or may be applied to a single apparatus. Further, the invention can also be applied in a case where a control program for implementing functions of an embodiment is directly or remotely provided to a system or an apparatus. Therefore, in order to implement the functions of the invention using a computer, a control program installed in the computer, a medium storing the control program, and a worldwide web (WWW) server causing the control program to be downloaded are included in the scope of the invention.

The application is based on Japanese Patent Application No. 2011-116367 filed on May 24, 2011, the content of which is incorporated herein by reference.

The invention claimed is:

1. An information processing apparatus, comprising:
a processor; and
a memory coupled to the processor, wherein the memory stores instructions configured to cause the processor to:
receive a data model file, the data model file representing a structure of data in a first language, the structure identifying a name and a type of data to be collected from a device by the information processing apparatus;
generate a database configuration file described in a second language by analyzing the structure defined in the data model file, the database configuration file configured to generate a database for accumulating data received from the device based on the name and type; and
generate an application interface described in a third language by analyzing the structure defined in the data model file, the application interface configured to enable an application to access the data accumulated in the database by specifying at least one of the name or an identifier associated with a row or column of a record in the database.

2. The information processing apparatus according to claim 1, wherein the first language is an extensible markup language (XML).

3. The information processing apparatus according to claim 1, wherein the second language is a structured query language (SQL).

4. The information processing apparatus according to claim 1, wherein the third language is a web services description language (WSDL).

5. The information processing apparatus according to claim 1, wherein the processor is further configured to
create a database from the database configuration file; and
collect the data from the device,
wherein the application interface searches for the data accumulated in the database and sends the data to the application, in response to a data request received from the application through a predetermined protocol.

6. The information processing apparatus according to claim 5, wherein the predetermined protocol is a simple object access protocol (SOAP).

7. The information processing apparatus according to claim 1, wherein the data model file comprises a processed data model that represents the structure of data in the first language, and the processor is further configured to:
generate a processing rule from the processed data model, wherein the processing rule is used to process the data received from the device to generate processed data.

8. The information processing apparatus according to claim 7, wherein the processor is further configured to:
store a function used in the processing rule; and
generate the processing rule based on the function.

9. The information processing apparatus according to claim 7, wherein the application interface:
causes the data received from the device to be processed in accordance with the processing rule in response to a request for the processed data received from the application through a predetermined protocol; and
causes the processed data to be sent to the application.

10. A computer-implemented method of controlling an information processing apparatus, the method comprising:
receiving a data model file, the data model file representing a structure of data in a first language, the structure identifying a name and a type of data to be collected from a device by the information processing apparatus;
generating a database configuration file described in a second language by analyzing the structure defined in the data model file, the database configuration file configured to generate a database for accumulating data received from the device based on the name and type; and
generating an application interface described in a third language by analyzing the structure defined in the data model file, the application interface configured to enable an application to access the data accumulated in the database by specifying at least one of the name or an identifier associated with a row or column of a record in the database.

11. A non-transitory computer readable medium storing a control program that causes a computer to execute instructions to:
receive a data model file, the data model file representing a structure of data in a first language, the structure identifying a name and a type of data to be collected from a device by the information processing apparatus;
generate a database configuration file described in a second language by analyzing the structure defined in the data model file, the database configuration file configured to generate a database for accumulating data received from the device based on the name and type; and
generate an application interface described in a third language by analyzing the structure defined in the data model file, the application interface configured to enable an application to access the data accumulated in the database by specifying at least one of the name or an identifier associated with a row or column of a record in the database.

12. An information processing apparatus comprising:
a memory storing instructions; and
a processor that, when executing the instructions, is configured to:
receive a data model file, the data model file representing a structure of data in a first language, the structure identifying a name and a type of data to be collected from a device by the information processing apparatus;
generate a database configuration file described in a second language by analyzing the structure defined in the data model file, the database configuration file configured to generate a database for accumulating data received from the device through a device interface based on the name and type;
generate an application interface described in a third language by analyzing the structure defined in the data model file, the application interface configured to enable an application to access the data accumulated in the database by specifying at least one of the name or an identifier associated with a row or column in the database;
collect the data from the device through a device interface;
search for the data accumulated in the database in response to a data request received from the application through a predetermined protocol; and
provide the data to the application through the application interface.

13. A data management method, comprising:
receiving a data model file, the data model file representing a structure of data in a first language, the structure identifying a name and a type of data to be collected from a device by the information processing apparatus;

generating a database configuration file described in a second language by analyzing the structure defined in the data model file, the database configuration file configured to generate a database for accumulating data received from the device based on the name and type; and generating an application interface described in a third language by analyzing the structure defined in the data model file, the application interface configured to enable the application to access the data accumulated in the database by specifying at least one of the name or an identifier associated with a row column of a record in the database;

collecting the data from the device through a device interface;

searching for the data accumulated in the database in response to a data request received from the application through a predetermined protocol; and providing the data to the application through the application interface.

* * * * *